United States Patent [19]
Seki et al.

[11] 4,216,438
[45] Aug. 5, 1980

[54] INTERNAL MIRROR TYPE GAS LASER TUBE

[76] Inventors: Fumio Seki; Taizo Oikado, both of Nippon Electric Co., Ltd., 33-1, Shiba Gochome, Minato-ku, Tokyo, Japan

[21] Appl. No.: 857,600

[22] Filed: Dec. 5, 1977

[30] Foreign Application Priority Data

Dec. 6, 1976 [JP] Japan .............................. 51-163723[U]

[51] Int. Cl.² .............................................. H01S 3/02
[52] U.S. Cl. .............................................. 331/94.5 D
[58] Field of Search .................... 331/94.5 D, 94.5 G, 331/94.5 T; 174/DIG. 8

[56] References Cited

U.S. PATENT DOCUMENTS

| | | | |
|---|---|---|---|
| 2,027,962 | 1/1936 | Currie | 174/DIG. 8 |
| 3,851,275 | 11/1974 | Furuse et al. | 331/94.5 D |
| 3,916,337 | 10/1975 | Kindl et al. | 331/94.5 D |
| 4,064,466 | 12/1977 | Seki et al. | 331/94.5 D |

OTHER PUBLICATIONS

L. R. Lidholt, "A Versatile 60 KV Switching System for Pulsed Excitation of Lasers", *The Review of Scientific Instruments*, vol. 43, No. 12, Dec. 1972, pp. 1765–1768.

*Primary Examiner*—James W. Davie
*Attorney, Agent, or Firm*—Hopgood, Calimafde, Kalil, Blaustein & Lieberman

[57] ABSTRACT

An internal mirror type gas laser tube having mirrors at the opposite ends thereof supported by hollow flexible metallic members to allow for mirror adjustment. The hollow members include a support pipe, provided outside of the hollow metallic member, the support pipe being covered by a thermocontractive insulating material. The insulating material eliminates electrical shock hazards which are present when the metallic member assumes the high voltage potential utilized to operate the laser.

7 Claims, 4 Drawing Figures

INTERNAL MIRROR TYPE GAS LASER TUBE

FIELD OF THE INVENTION

The present invention relates to an internal mirror type gas laser tube, and more particularly, to an internal mirror type gas laser tube having metallic members for supporting mirrors.

DESCRIPTION OF THE PRIOR ART

In known internal mirror type gas laser tubes, two mirrors, forming a resonator are directly attached to the laser tube in such a way that a vacuum envelope is formed. Such a gas laser tube principally consists of a laser capillary, for confining a plasma of laser medium such as hellium and neon therein, an anode and a cathode, for making the gas in the capillary discharge, two mirrors, disposed on the center axis of the laser capillary at its opposite ends in a mutually opposed relationship, and an envelope for holding the respective components in a predetermined relationship and for maintaining a vacuum therein.

For the purposes of attaching the mirrors to the vacuum envelope, in such internal mirror type gas laser tubes, a vacuum binder or a low melting point solder glass is normally employed. The vacuum binder is generally not satisfactory because of discharge gas from the binder and degradation of the binder during long periods of use. Therefore vacuum binder tend to be used for assembling application instruments. Alternatively when using solder glass, it is difficult to adjust the mirror during the attachment process because the solder glass is molten at high temperatures. One solution for these problems, suggested in prior art laser tubes of the glass seal type, is the use of a method wherein the mirrors on the envelope are mounted on hollow metallic members to allow for mirror adjustment. The metallic members preferably have at least two fins and, subsequent to sealing the mirrors, the mirror adjustment is effected by bending these hollow metallic members. This prior art method is fully described in U.S. Pat. No. 3,851,275.

A important disadvantage in this prior art laser tube structure however, is the fact that the inner surface of the hollow metallic member for mirror adjustment makes contact with a part of the plasma within the gas laser tube. The result is that the hollow member assumes the same potential as the anode or the cathode. Accordingly, the hollow metallic member, when disposed on a high voltage electrode side, will have a potential that is as high as the several kilovolts required for operation of the laser tube. Consequently, the laser tube has important disadvantages in that not only is it necessary to dispose the laser tube so as to maintain a predetermined separation between the laser case and the hollow metallic member, but there is also the danger of severe electrical shock to operators and bystanders if the hollow member should accidentally be touched. One solution to these disadvantages would be to cover the mirror support section, including the hollow metallic member, with an insulating material. However with such a covering the problem still remains of implementing the insulating cover in a compact manner and without disturbing the mirror alignment.

It is therefore an object of the present invention to provide an internal mirror type gas laser tube, in which a metallic member, for supporting a mirror, is insulated in a compact manner without disturbing mirror alignment.

SUMMARY OF THE INVENTION

According to one preferred embodiment of the present invention, there is provided an internal mirror type gas laser tube having at the opposite ends thereof mirrors, supported by hollow flexible metallic members to allow for mirror adjustment.

It is a feature of the invention that the hollow members include a hollow support pipe, provided outside of the hollow metallic member, and the outside of said hollow support pipe is covered by a thermo-contractive insulating meterial.

It is another feature of the invention that the hollow metallic member, for mirror adjustment, has a smaller inner diameter portion attached to one of the fins.

It is a further feature of the invention that the insulating cover is attached to only one of the two or more adjustment member fins and does not contact the other of the fins.

The foregoing and other objects and features of this invention will be more fully understood from the following description of an illustrative embodiment thereof taken in conjunction with the accompanying drawings.

DETAILED DESCRIPTION OF PREFERRED EMBODIMENTS

Figure 1:
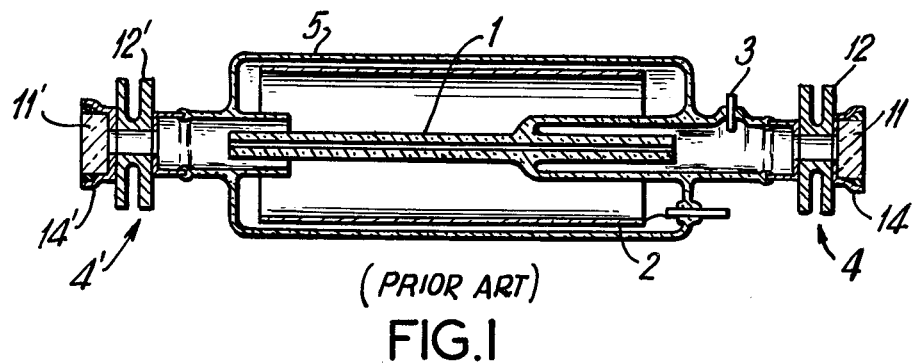
FIG. 1 is a longitudinal cross-sectional view of a prior art internal mirror type gas laser tube.

Referring to FIG. 1, a typical prior art internal mirror type gas laser tube comprises a capillary tube 1 defining an active region for a laser medium, an envelope 5 disposed coaxially with the capillary tube 1, mirror support sections 4 and 4' mounted at the opposite ends of the envelope 5, and mirrors 11 and 11', which as a whole form a vacuum vessel. The mirror support sections 4 and 4', respectively, have hollow metallic members 12 and 12' for mirror adjustment and at the outside ends of these hollow metallic members 12 and 12' are fixedly mounted mirrors 11 and 11', respectively, via metallic sealing dishes 14 and 14'. In the capillary tube 1 is enclosed a laser medium such as, for instance, a mixture of He and Ne gas, which is made to discharge by connecting a high voltage source (not shown) between a cathode 2 and a anode 3 so as to apply a voltage of several kilovolts therebetween, and thereby induce a laser oscillation. Upon the high voltage discharge, the inner surfaces of the hollow metallic members for mirror adjustment 12 and 12' make contact with a part of the plasma within the laser tube. Therefore, these hollow metallic members 12 and 12' assume the same potential as the cathode 2 or the anode 3. Consequently, the hollow metallic members 12 or 12' on the high voltage electrode side, will assume a high voltage potential of several kilovolts which is required for the laser operation. Due to the presence of this high voltage on the hollow members there is a great risk of electric shock to operators and bystanders. The present invention resolves this problem.

Figure 2:
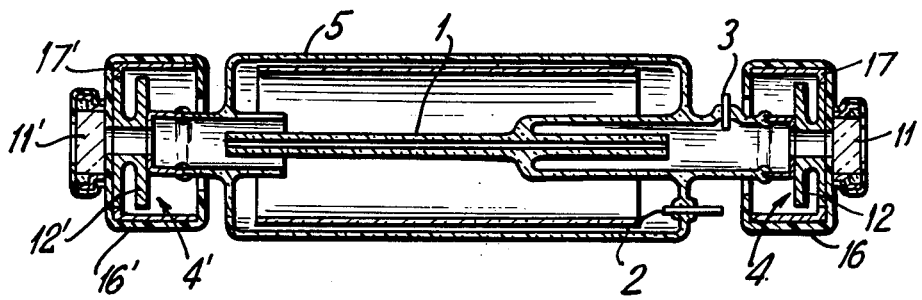
FIG. 2 is a longitudinal cross-sectional view of an internal mirror type gas laser tube according to a first preferred embodiment of the present invention.

A first preferred embodiment of the present invention is illustrated in FIG. 2, in which reference numerals 1 to 5 and 11 and 12 designate the same members as those represented by like numerals in FIG. 1. In this preferred embodiment, the outside of the hollow metallic members for mirror adjustment 12, and 12' in the mirror support sections 4 and 4', are provided with hollow cylindrical support pipes 17 and 17', respectively, and coatings 16 and 16' made of insulating material to cover pipes 17 and 17'. Since the mirror support sections 4 and 4' have the same structure, a detailed description will be made only of the mirror support section 4 on the anode side with reference to FIG. 3. The pipe 17 and insulating coat 16 may be provided only at the high voltage electrode.

The mirror support section 4 is comprised of a hollow metallic member for mirror adjustment 12 having two fins 121 and 122, a metallic sleeve 13 made of a metallic material that can be hermetically sealed with glass, and a metallic sealing dish 14. One side of the sleeve 13 is hermetically sealed with glass envelope 5, and the other side with the adjustment member 12. A mirror 11 is bonded to the sealing dish 14 by means of low melting point glass 15. The hollow metallic member for mirror adjustment 12 has a recessed shape in cross-section. The thickness of the member portion, corresponding to the bottom of the recess, is minimal so that the bottom portion can be plastically deformed by applying a force to the fin portion. The application of this force allows the alignment of the mirror to be adjusted.

Outside of the hollow metallic member for mirror adjustment 12, is disposed a hollow cylindrical support pipe 17, havng an L-shaped cross-section consisting of a small inner diameter portion and a large inner diameter portion. The small inner diameter portion, of this support pipe 17, is fixedly secured to the metallic fin 121 by spot welding. Since the support pipe 17 has an L-shaped cross-section, it is not in contact with the other fin 122. The hollow support pipe 17, and the mirror support section 4, are covered by a thermo-contractive insulating sleeve 16. A thermo-contractive insulating material is defined as an insulating material which contracts when heated. One such material is, Thermofit, a trade name for a product manufactured by Raycem Company, and this product can be used with the instant invention. When such a insulating material is applied to the laser tube and heated by means of a dryer, the insulating material will contract into a shape conforming to the external shape of the hollow cylindrical support pipe 17 and the mirror support section 4. The material is designed to hold the contracted state even after cooling. It is to be noted that the hollow cylindrical support pipe 17 and the thermo-contractive insulating sieeve 16 are, of course, mounted after completion of alignment of the mirrors 11 and 11'.

The internal mirror type gas laser tube, having the above-described construction, is safe in use and can also be housed in a small case. This advantage is achieved because the mirror support sections which might assume a high voltage potential are covered by an insulator and have no exposed metallic portions. Furthermore, since the structure is such that the hollow cylindrical support pipe is fixedly secured to only one of the two fins of the hollow metallic member for mirror adjustment, no force is exerted between the two fins, even when the thermo-contractive insulating material is heated or even when the temperature of the laser tube varies during its operation resulting in thermal expansion of the metallic member. Therefore, a stable laser output can be obtained without disturbing the alignment of the mirrors. In addition, since the insulating material is fitted to the mirror support structure the insulating structure per se can be made light in weight, small in size and less expensive.

Figure 4:
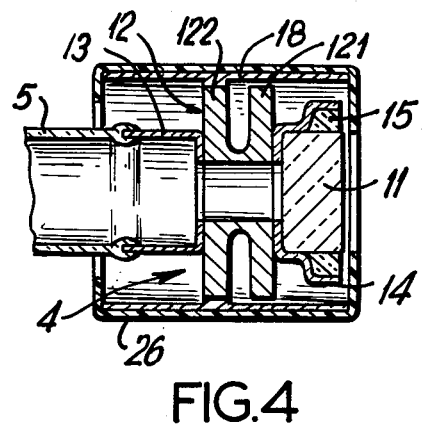
FIG. 4 is an enlarged cross-sectional view of an insulating structure showing a second preferred embodiment of the present invention.

A second preferred embodiment of the present invention is illustrated in FIG. 4. In this embodiment, a hollow cylindrical support pipe 18 is fixedly secured to the fin 122. The support pipe extends up to the sealing dish 14 with a uniform external diameter, and the end of the thermo-contractive insulating sleeve 26 on the mirror side is not in contact with the mirror. With such a structure, even if a force is exerted upon the thermo-contractive sleeve, no force is exerted between the two fins, and hence the alignment of the mirrors is not disturbed.

While the mirror support section 4 is comprised of a metallic sleeve 13, a hollow metallic member for mirror adjustment 12 and a sealing dish 14, in the above-described embodiments of the present invention, these elements may be formed in an integral structure.

Figure 3:
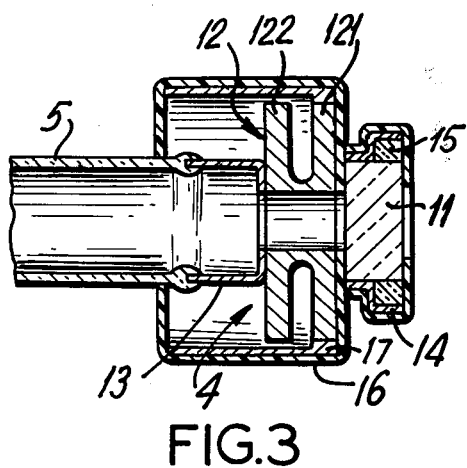
FIG. 3 is an enlarged partial cross-sectional view of the laser tube for FIG. 2 showing an insulating structure of its mirror support section.

The insulation structure of this invention is not limited to these shown in FIGS. 3 and 4. For example, the surface of the support pipe 18 may be preliminarily glazed, oxidized or coated with an insulating material such as plastic, instead of using plastic sleeve 26. In place of the soft sleeves 16 and 26, a hard insulating member may be employed which is directly fixed to fins 121 or 122 with the aid of a binding agent, via metallic pipes 17 and 18 or through use of other fixing aids. Also, the hollow support pipes 17 and 18 may be made of insulating material, and in this case the sleeve 16, 26 may be omitted.

Although a specific embodiment of this invention has been shown and described, it will be understood that various modifications may be made without departing from the spirit of this invention.

We claim:

1. An internal mirror type gas laser tube capable of stable output power comprising, an envelope for a laser medium, anode and cathode electrodes, a pair of metallic adjustment members fixed at opposite ends of said envelope, each member having at least two fins, a pair of mirrors respectively fixed to the pair of metallic adjustment members, an insulating covering member covering the exposed outside surface of at least one of said metallic adjustment members, and means for mechanically fixing said covering member to a limited portion of a predetermined one of the fins of said one metallic adjustment member so as to retain spacing between said one fin and the other of said fins.

2. The gas laser tube of claim 1, wherein said fixing means includes a pipe-shaped metallic member and said insulating covering member is fixed to and supported by said pipe-shaped metallic member.

3. The gas laser of claim 2, wherein said pipe-shaped metallic member comprises a first portion connected to one of said fins and a second portion extending along a length-wise direction of said metallic adjustment member and spaced apart from the other of said fins.

4. The gas laser tube of claim 1, wherein said fixing means includes a metallic pipe with an inner diameter sufficiently large so that the pipe is not in contact with said metallic adjustment member and a length sufficient to cover said metallic adjustment member, said metallic pipe having an inside projected portion adapted to connect with one of said fins of said adjustment member, and said insulating covering member including a thermo-contractive insulating film attached to the outer surface of said metallic pipe.

5. The gas laser tube of claim 1, wherein said insulating covering member includes an insulating pipe having an inner diameter of sufficient size so that the inner portion of the insulating pipe does not make contact with said metallic adjustment member and a length sufficient to cover said metallic adjustment member, said insulating pipe having an inside projected portion adapted to connect with one of said fins of said adjustment member.

6. An internal mirror type gas laser tube capable of stable output power comprising, an envelope for a laser medium. anode and cathode electrodes, a pair of metallic adjustment members fixed at opposite ends of said envelope, each member having at least two fins, a pair of mirrors respectively fixed to the pair of metallic adjustment members, a hard insulating cover member and means for mechanically fixing said covering member to a limited portion of a predetermined one of the fins of said metallic adjustment member so as to retain spacing between said one fin and the other of said fins and to cover said metallic adjustment member.

7. An improved shock-proof internal mirror type gas laser tube capable of stable output power comprising, an envelope for a laser medium, anode and cathode electrodes, a pair of metallic adjustment members fixed at opposite ends of said envelope, each member having at least two fins, a pair of mirrors respectively fixed to the pair of metallic adjustment members, wherein the improvement comprises a hard insulating cover member and means for mechanically fixing said covering member to a limited portion of a predetermined one of the fins of said metallic adjustment member so as to retain spacing between said one fin and the other of said fins and to cover said metallic adjustment member.

* * * * *